Jan. 10, 1967    W. A. MERKL    3,297,957

GROOVED ACTIVE MEDIUM FOR LASER

Filed April 30, 1963

INVENTOR,
WALTER A. MERKL.

BY *Harry M. Saragovitz*

ATTORNEY.

United States Patent Office 3,297,957
Patented Jan. 10, 1967

3,297,957
GROOVED ACTIVE MEDIUM FOR LASER
Walter A. Merkl, Eatontown, N.J., assignor to the United States of America as represented by the Secretary of the Army
Filed Apr. 30, 1963, Ser. No. 277,425
4 Claims. (Cl. 331—94.5)

The invention described herein may be manufactured and used by or for the Government for governmental purposes without the payment of any royalty thereon.

This invention relates to lasers and more particularly to improved active laser rods.

Laser stands for "light amplification by stimulated emission of radiation." Following the proposal to extend the maser principle to the optical spectral region, some workers in the art have used the acronym "laser" instead of "optical maser." Generally speaking, lasers may be defined as devices for the generation or amplification of coherent and monochromatic light waves in the optical region of the electromagnetic spectrum. The general principles of lasers are described in a paper entitled "Optical Masers" appearing in volume 204, No. 6, Scientific American, June 1961, pp. 52–61.

A laser consists of an amplifying atomic medium, or active laser medium, occupying all, or part, of the volume of a suitable resonator. The role of the resonator is to maintain an electromagnetic field configuration whose losses are replenished by the amplifying medium through induced emission. The optical resonators used in lasers consist usually of a cylindrical solid crystal region with two opposing plane parallel or curved reflectors at right angles to the cylindrical axis. The oscillation consists essentially of a standing wave generated by a plane wave bouncing back and forth between the two reflectors. Such a laser will go into oscillation when sufficient population inversion has been attained by pumping with a high intensity light source.

It has recently been proposed to utilize lasers in the fields of communications, range-finding, space vehicle guidance and special purpose illumination. However, the main difficulties with these prior lasers are that their use is unsuited for these applications because they yield insufficient power output, and their efficiency is relatively poor.

The primary object of the present invention is to provide laser rods having improved overall efficiency.

An illustrative embodiment of the invention comprises a cylindrical active laser medium having at least one groove disposed in the cylindrical surface thereof substantially transverse to its longitudinal axis.

For a more detailed description of the invention together with other and further objects thereof, reference is had to the following description, taken in connection with the accompanying drawing, in which.

Figure 1:
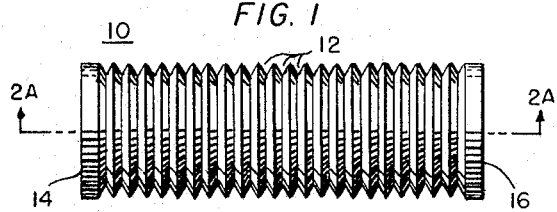
FIG. 1 is a plan view of a laser rod illustrative of this invention.
Figure 3:
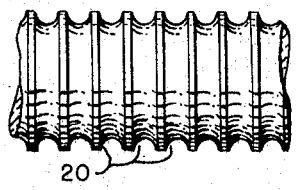
Figure 4:
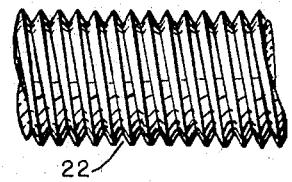
Figure 5:
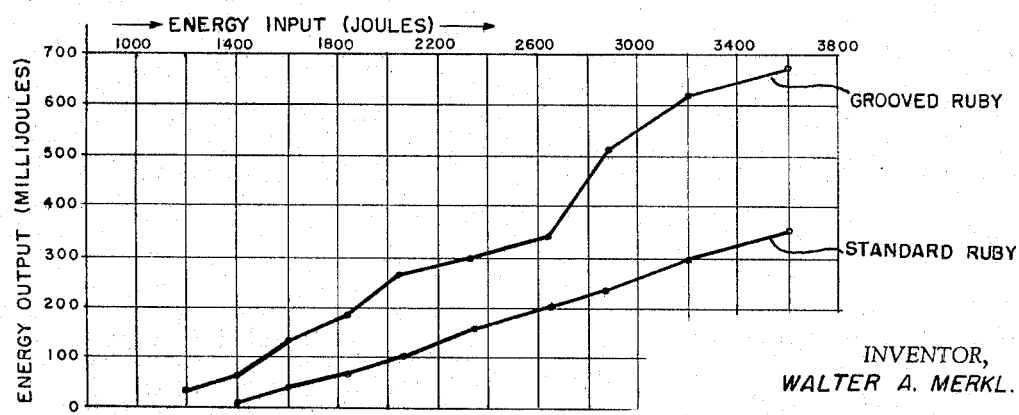

FIGS. 3 and 4 each show plan views of a modification of the laser rod illustrated in FIG. 1; and FIG. 5 shows a laser output diagram which will be helpful in explaining the invention.

In the drawing, FIG. 1 shows an active laser medium 10, such as a synthetic pink ruby, in which the principles of the present invention are illustratively embodied.

Ruby, which is a crystalline aluminum oxide with chromium atoms substituted for some of the aluminum atoms, has a set of energy levels well suited for use in a laser, as most of the chromium atoms can be placed in an excited metastable state, so that an electromagnetic wave of the right frequency passing through them will stimulate a cascade of photons. Other examples of suitable active laser mediums are those using samarium or uranium ions in a calcium fluoride crystal, and the recently announced glass laser which comprises a rod of barium crown glass doped with neodymium ions.

Ruby 10 constitutes a cylindrical rod preferably about 1.5 inches long and about .25 inch in diameter, but may be of any suitable length and diameter. Disposed in the cylindrical surface, and encircling rod 10 are parallel grooves 12 oriented normal to the longitudinal axis of the rod. Grooves 12 are of V-shaped cross-section whose side walls form an angle of about 60°. It has been found that the output energy of a grooved cylindrical crystal laser rod remained substantially constant when any rod had grooves of the same angular dimension ranging from about 60° to about 90°. Such identical grooves could be disposed on the cylindrical surface of ruby 10 along part of its length, or along its entire length. The opposite flat parallel ends 14 and 16 of ruby 10 are plated with silver to form reflectors. Reflector 14 is opaque and of maximum reflectance, and output reflector 16 is partially reflective. Ruby rod 10 is surrounded by a conventional flash tube (not shown) to provide broadband pumping light thereto, whereby the laser in which ruby rod 10 may be positioned will go into oscillation, as described above.

Figure 2A:
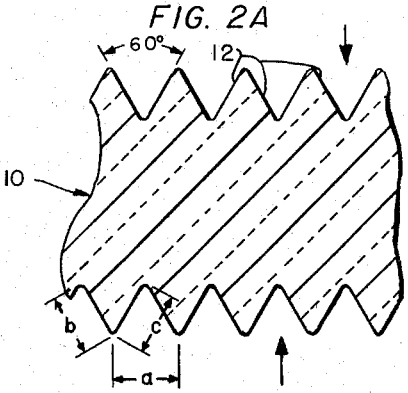
FIG. 2A is a diagrammatic sketch of an enlarged section of the laser rod of FIG. 1 taken thru lines 2—2.

FIG. 2A shows a planar sectional view through rod 10. As can be seen from the drawing, the side walls $b$ and $c$ forming each groove 12 makes an angle of about 60°, and the linear distance from crest to crest of each side wall $b$ and $c$, respectively, is indicated by $a$. Thus, light (shown by arrows) directed towards the grooves 12 would impinge on substantially double the area on the cylindrical surface of rod 10.

Figure 2B:
FIG. 2B is a sectional view similar to FIG. 2A of a portion of a rod in which the side walls of each groove form an angle of 90°.

In the form shown in FIG. 2B, the cylindrical surface on the laser rod has parallel grooves 18 normal to the longitudinal axis and encircling the rod. Grooves 18 are of V-shaped cross-section whose side walls form an angle of about 90°.

In the modification shown in FIG. 3, the cylindrical surface of the laser rod has spaced parallel grooves 20 encircling the rod. Grooves 20 are normal to the longitudinal axis of the laser rod and form channels having a U-shaped cross-section.

An embodiment is shown in FIG. 4 in which a continuous spiral groove or helix 22 encircles the cylindrical surface of the laser rod.

FIG. 5 shows the performance of a standard prior art cylindrical ruby laser rod compared with the performance of a grooved ruby laser rod in accordance with the invention. The standard (ungrooved) cylindrical ruby laser rod used in the example for control purposes was 1.5 inches in length and .25 inch in diameter. Another ruby rod, with identical dimensions and processed from an adjacent section of the same piece of ruby, had parallel triangular grooves encircling its cylindrical surface and normal to the longitudinal axis of the rod. The side walls making up each groove in the cut laser rod formed an angle of about 60°. The grooves were cut into the rods cylindrical surface, at its greatest depth, to about .02 inch. The grooves extended over the entire length of the grooved rod, except for ⅛ inch at each end, which uncut portions were used for mounting the laser rod in the laser device. The end surfaces of both ruby rods, the standard and the grooved, were polished flat to ¼ of a wavelength of light and made parallel to better than 2 seconds of arc. One end of each ruby rod was plated with silver to maximum reflectivity and the other end of each rod was silver plated for 95% reflection. In FIG. 5 the threshold energy required for activation of the standard control rod is shown as 1400 joules, while that for the grooved ruby was only 1200 joules. The output energy of the standard control rod ranged from 10 to 350 millijoules with input energies ranging from 1400 to 3600 joules. On the other hand, the output energy of the grooved rod ranged from 60 to 670 millijoules over the same input energy range.

Although the example described utilized a ruby crystal, it is to be understood that the principles of the invention are applicable to any active medium in which the desired separation of energy levels are realized.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A negative temperature medium for a laser, said negative medium comprising a cylindrical ruby rod having a plurality of parallel grooves encircling its cylindrical surface over substantially its entire length and oriented normal to its longitudinal axis; and wherein each of said grooves has a V-shaped cross-section with side walls forming an angle ranging from substantially 60° to substantially 90°.

2. A negative temperature medium for a laser as set forth in claim 1 wherein the depth of each of said V-shaped grooves, measured normal to the surface of said cylindrical rod, is about .02 inch.

3. A negative temperature medium for a laser, said negative temperature medium comprising a cylindrical ruby rod having a plurality of spaced parallel grooves encircling its cylindrical surface over substantially its entire length and oriented normal to its longitudinal axis, said grooves being of U-shaped cross-section.

4. A negative temperature medium for a laser, said negative temperature medium comprising a cylindrical ruby rod having a groove encircling its cylindrical surface over substantially its entire length in the form of a tightly wound helix.

References Cited by the Examiner

UNITED STATES PATENTS

| | | | |
|---|---|---|---|
| 551,769 | 12/1895 | Jacobson | 88—1 |
| 3,222,615 | 12/1965 | Holly | 331—94.5 |

JEWELL H. PEDERSEN, *Primary Examiner.*

W. L. SIKES, *Assistant Examiner.*